(12) United States Patent
Kim et al.

(10) Patent No.: US 11,934,668 B2
(45) Date of Patent: Mar. 19, 2024

(54) ELECTRONIC DEVICE WITH STORAGE DEVICE DATA CONVERSION

(71) Applicant: SAMSUNG ELECTRONICS CO., LTD., Suwon-si (KR)

(72) Inventors: Hyunsoo Kim, Bucheon-si (KR); Seungwon Lee, Hwaseong-si (KR); Yuhwan Ro, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/202,591

(22) Filed: Mar. 16, 2021

(65) Prior Publication Data

US 2022/0066660 A1 Mar. 3, 2022

(30) Foreign Application Priority Data

Sep. 2, 2020 (KR) .................. 10-2020-0111896

(51) Int. Cl.
*G06F 3/06* (2006.01)
*G06F 7/575* (2006.01)
*G06N 3/02* (2006.01)

(52) U.S. Cl.
CPC ............ *G06F 3/0626* (2013.01); *G06F 3/061* (2013.01); *G06F 3/0629* (2013.01);
(Continued)

(58) Field of Classification Search
CPC ............... G06F 9/3004; G06F 15/7821; G06F 12/0653; G06F 17/16; G06F 2212/251; G06N 3/04; G06N 3/063
See application file for complete search history.

(56) References Cited

U.S. PATENT DOCUMENTS

| 4,873,630 | A | * | 10/1989 | Rusterholz | .......... G06F 9/30018 |
| | | | | | 712/E9.071 |
| 5,440,718 | A | * | 8/1995 | Kumagai | ............. G11C 7/1006 |
| | | | | | 345/545 |

(Continued)

FOREIGN PATENT DOCUMENTS

| EP | 3 620 910 A1 | 3/2020 |
| KR | 10-2013-0098328 A | 9/2013 |

(Continued)

OTHER PUBLICATIONS

Suda, Naveen, et al. "Throughput-optimized OpenCL-based FPGA accelerator for large-scale convolutional neural networks." Proceedings of the 2016 ACM/SIGDA International Symposium on Field-Programmable Gate Arrays. 2016. (Year: 2016).*

(Continued)

*Primary Examiner* — Charles Rones
*Assistant Examiner* — Hewy H Li
(74) *Attorney, Agent, or Firm* — NSIP Law

(57) ABSTRACT

A method of operating a storage device includes storing received input data of a first format, converting the input data into a second format for an operation to be performed on the input data of the second format using an operator included in the storage device, and converting the input data into a second format for an operation to be performed on the input data, through an operator included in the storage device, and re-storing the input data of the second format.

25 Claims, 8 Drawing Sheets

(52) U.S. Cl.
CPC ............ *G06F 3/0673* (2013.01); *G06F 7/575* (2013.01); *G06N 3/02* (2013.01)

(56) References Cited

U.S. PATENT DOCUMENTS

| | | | | |
|---|---|---|---|---|
| 10,373,500 | B1* | 8/2019 | Chan | H04W 84/00 |
| 10,437,474 | B1* | 10/2019 | Armangau | G06F 3/061 |
| 2005/0010691 | A1* | 1/2005 | Oyadomari | H04L 43/18 |
| | | | | 709/248 |
| 2009/0198978 | A1* | 8/2009 | Greenhalgh | G06F 9/3808 |
| | | | | 712/226 |
| 2010/0059880 | A1* | 3/2010 | Baek | H05K 1/147 |
| | | | | 257/713 |
| 2011/0202745 | A1* | 8/2011 | Bordawekar | G06T 1/20 |
| | | | | 712/30 |
| 2014/0217586 | A1* | 8/2014 | Kim | H01L 25/105 |
| | | | | 257/738 |
| 2017/0372202 | A1* | 12/2017 | Ginsburg | G06N 3/045 |
| 2018/0322382 | A1* | 11/2018 | Mellempudi | G06T 1/20 |
| 2019/0042945 | A1 | 2/2019 | Majumdar et al. | |
| 2020/0133854 | A1* | 4/2020 | Yang | G06F 12/0653 |
| 2020/0167632 | A1 | 5/2020 | Kim et al. | |
| 2020/0242474 | A1 | 7/2020 | Lo et al. | |
| 2020/0272416 | A1* | 8/2020 | Ramesh | G06F 7/485 |
| 2021/0124580 | A1* | 4/2021 | Heinecke | G06F 9/30014 |
| 2021/0125042 | A1* | 4/2021 | Han | G06N 3/063 |
| 2021/0208887 | A1* | 7/2021 | Ramesh | G06F 9/30018 |

FOREIGN PATENT DOCUMENTS

| | | | |
|---|---|---|---|
| KR | 10-2019-0036358 A | | 4/2019 |
| KR | 10-2019-0043849 A | | 4/2019 |
| KR | 10-2019-0129702 A | | 11/2019 |
| WO | WO-2016169032 A1 * | 10/2016 | ............ G06F 12/00 |

OTHER PUBLICATIONS

McKennon, Justin. "CUDA Host/Device Transfers and Data Movement". Pub Jun. 24, 2013. <https://www.microway.com/hpc-tech-tips/cuda-host-to-device-transfers-and-data-movement/>. (Year: 2013).*

Son, Young Hoon, et al. "Reducing memory access latency with asymmetric DRAM bank organizations." Proceedings of the 40th Annual International Symposium on Computer Architecture. 2013.. (Year: 2013).*

Amir, Mohammad Faisal, et al. "3-D stacked image sensor with deep neural network computation." IEEE Sensors Journal 18.10 (2018): 4187-4199.. (Year: 2018).*

Alternate translation of Chai WO 2016/169032 from Patentscope. (Year: 2016).*

Extended European Search Report dated Dec. 22, 2021 in counterpart European Patent Application No. 21188263.4 (6 pages in English).

* cited by examiner

ELECTRONIC DEVICE WITH STORAGE DEVICE DATA CONVERSION

CROSS-REFERENCE TO RELATED APPLICATIONS

This application claims the benefit under 35 USC § 119(a) of Korean Patent Application No. 10-2020-0111896 filed on Sep. 2, 2020 in the Korean Intellectual Property Office, the entire disclosure of which is incorporated herein by reference for all purposes.

BACKGROUND

1. Field

The following description relates to an electronic device with storage device implementation.

2. Description of Related Art

In artificial intelligence (AI) technology, independent hardware dedicated to AI may perform inference and learning through predetermined operations.

A hardware accelerator may be used to efficiently process a deep neural network (DNN) due to the number of operations on complex input data. In particular, the memory bandwidth and the latency or delay time may cause a significant performance bottleneck in many process systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating a storage device includes storing received input data of a first format, converting the input data into a second format for an operation to be performed on the input data of the second format using an operator included in the storage device, and re-storing the input data of the second format.

The converting may include converting the input data of the first format into the second format by applying any one or any combination of any two or more of type converting, quantization, dequantization, padding, packing, and unpacking to the input data of the first format.

The second format may have a lower memory bandwidth than the first format.

The operation to be performed on the input data may be a low precision operation performable in the second format and has a lower precision than a high precision operation performable in the first format.

The operation to be performed on the input data may be performed in the second format by the operator or an accelerator receiving the input data of the second format from the storage device.

The operation to be performed on the input data may be one of operations that are performed by a neural network configured to infer the input data.

The method may further include converting result data of the operation performed on the input data into the first format, and outputting the result data of the first format.

The operator may be disposed adjacent to a bank configured to store data in the storage device.

The operator may include an arithmetic logic unit (ALU) configured to perform a predetermined operation.

The input data may include at least one of image data of the first format captured by an image sensor, and data of the first format processed by a host processor configured to control either one or both of the storage device and an accelerator connected to the storage device.

The storage device may be a dynamic random-access memory (DRAM) located outside an accelerator that performs the operation.

The storage device may be included in a user terminal into which data to be inferred through a neural network that performs the operation are input or a server that receives the data to be inferred from the user terminal.

The first format may be a 32-bit floating point (FP32) format and the second format may be a 16-bit floating point (FP16) format or an 8-bit integer (INT8) format.

In another general aspect, a storage device includes a bank configured to store received input data of a first format, and an operator disposed adjacent to the bank and configured to convert the input data into a second format for an operation to be performed on the input data of the second format, wherein the input data of the second format may be re-stored in the bank.

The operator may be configured to convert the input data of the first format into the second format by applying any one or any combination of any two or more of type converting, quantization, dequantization, padding, packing, and unpacking to the input data of the first format.

The second format may be a lower memory bandwidth than the first format.

The operation to be performed on the input data may be a low precision operation performable in the second format and may have a lower precision than a high precision operation performable in the first format.

The operator may be configured to convert result data of the operation performed on the input data into the first format, and the bank may be configured to store the result data of the first format.

The first format may be a 32-bit floating point (FP32) format and the second format may be a 16-bit floating point (FP16) format or an 8-bit integer (INT8) format.

An electronic device may include the storage device.

In still another general aspect, an electronic device includes a storage device configured to store received input data of a first format, convert the input data of the first format into a second format for an operation to be performed through an internal operator of the storage device, and re-store the input data of the second format, and an accelerator configured to perform the operation on the input data of the second format received from the storage device.

The storage device may include the internal operator configured to convert the input data of the first format into the second format by applying any one or any combination of any two or more of type converting, quantization, dequantization, padding, packing, and unpacking to the input data of the first format.

The first format may be a 32-bit floating point (FP32) format and the second format may be a 16-bit floating point (FP16) format or an 8-bit integer (INT8) format.

The accelerator may be configured to perform an inference operation on the input data of the second format received from the storage device.

Other features and aspects will be apparent from the following detailed description, the drawings, and the claims.

Figure 1:
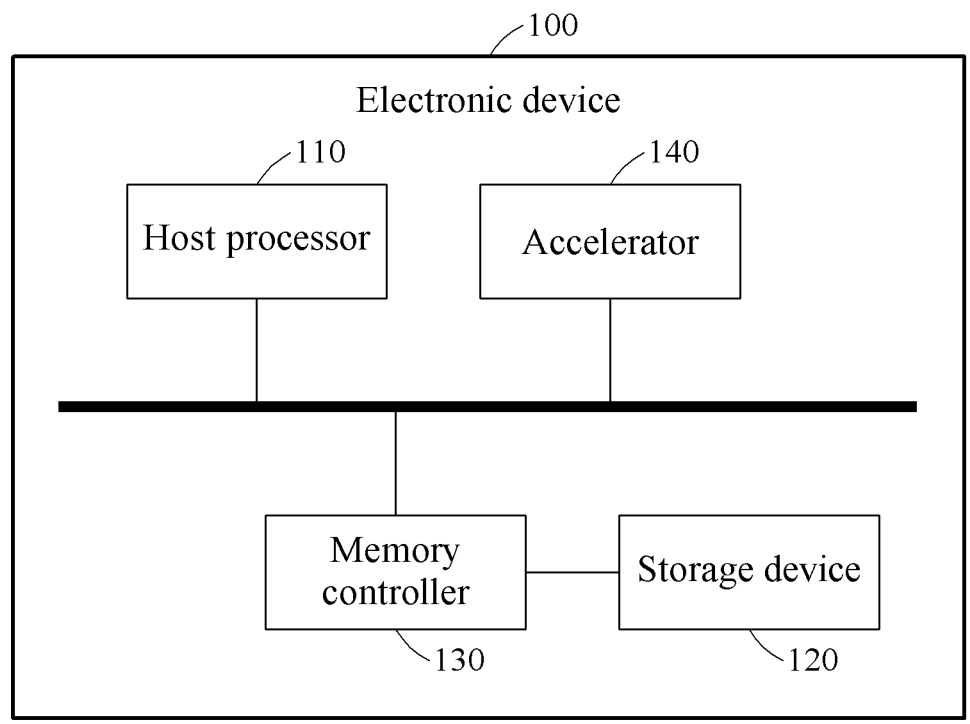
FIG. 1 illustrates an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 illustrates an example of an electronic device.

Referring to FIG. 1, an electronic device 100 may include a host processor 110, a storage device 120, a memory controller 130, and an accelerator 140. The host processor 110, the storage device 120, the memory controller 130, and the accelerator 140 may communicate with each other through a bus.

The host processor 110 is a device that controls operations of components included in the electronic device 100, and may include, for example, a central processing unit (CPU) and/or a graphics processing unit (GPU). The host processor 110 may receive a request to process a neural network in the accelerator 140, and generate an instruction executable by the accelerator 140 in response to the request. The request is for data inference based on a neural network, and may cause the accelerator 140 to execute the neural network to obtain a data inference result for object recognition, pattern recognition, computer vision, speech recognition, machine translation, machine interpretation, and the like. The host processor 110 may transmit inference target data and parameters of the neural network to the accelerator 140.

The storage device 120 is an off-chip memory disposed outside the accelerator 140 and may be, for example, a dynamic random-access memory (DRAM) utilized as a main memory of the electronic device 100. The storage device 120 may be accessed through the memory controller 130. The storage device 120 may store the inference target data and/or the parameters of the neural network to be executed by the accelerator 140, and the stored data may be transmitted to the accelerator 140 for later inference. In addition, the storage device 120 may be utilized when the on-chip memory in the accelerator 140 is insufficient to execute the neural network in the accelerator 140.

The accelerator 140 may be an AI accelerator that infer input data by executing the neural network based on instructions from the host processor 110. The accelerator 140 may be a separate processor different from the host processor 110. For example, the accelerator 140 may be a neural processing unit (NPU), a GPU, or a tensor processing unit (TPU).

The accelerator 140 may process tasks that may be more efficiently processed by a separate exclusive processor (that is, the accelerator 140), rather than by the general-purpose host processor 110, due to the characteristics of the operations of the neural network. In this example, the on-chip memory and one or more processing elements (PEs) included in the accelerator 140 may be utilized. The on-chip memory is a global buffer included in the accelerator 140 and may be distinguished from the storage device 120 disposed outside the accelerator 140. For example, the on-chip memory may be a scratchpad memory, a static random-access memory (SRAM), or the like that is accessible through an address space.

The neural network may include an input layer, a plurality of hidden layers, and an output layer. Each of the layers may include a plurality of nodes, also called artificial neurons. Each node is a calculation unit having one or more inputs and an output, and the nodes may be connected to each other. A weight may be set for a connection between nodes, and the weight may be adjusted or changed. The weight amplifies, reduces, or maintains a relevant data value, thereby determining a degree of influence of the data value on a final result. Weighted inputs of nodes included in a previous layer may be input into each node included in the output layer. A process of inputting weighted data from a predetermined layer to the next layer is referred to as propagation.

The parameters of the neural network, including the weights described above, may be learned in advance. Such learning may be performed in a high-precision format (for example, a 32-bit floating point) to secure the accuracy of the neural network. The training operation of the neural network may be performed by an independent device other than the accelerator 140 that performs data inference. However, examples are not limited thereto, and the neural network may be trained by the accelerator 140. Various known training techniques may be applied to the training of the neural network without limitation, and detailed descriptions thereof will be omitted.

The parameters of the trained neural network may be transmitted to the accelerator 140, and the accelerator 140 may perform data inference based on the neural network. In such an example, the accelerator 140 is a dedicated hardware for executing the trained neural network to obtain a data inference result. The accelerator 140 may operate in a low-precision format (for example, an 8-bit integer) that may reduce overhead within an allowable accuracy loss and obtain an operation efficiency to obtain the inference result quickly by analyzing a relatively large volume of data. For example, the accelerator 140 may perform neural network-based operations (for example, multiply and accumulate (MAC) operations) in the 8-bit integer format.

To execute a high-precision trained neural network in an accelerator 140 that operates in a low-precision format, high-precision data parameter may be desired to be converted into a low-precision data parameter. If the format conversion is performed by the accelerator 140 after the high-precision data is transferred to the accelerator 140, the high-precision data may be desired to be transmitted to the accelerator 140 using a high memory bandwidth. Thus, an inevitable memory bandwidth loss may occur, which results in software overhead. Further, an additional operation for the format conversion in the accelerator 140 may be desired, which may lead to an increase in the operation quantity and response time. Accordingly, it may be more efficient for the storage device 120 storing the data of the high-precision format to convert the data into the low-precision format and then, transmit the data of the low-precision format to the accelerator 140. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Input data to be inferred may be data processed by the host processor 110. The host processor 110 is general-purpose hardware for performing various processing and may operate in a high-precision format for operation accuracy. Further, the input data to be inferred may be image data of a high-precision format captured by an image sensor (for example, a high-resolution camera). In order for the accelerator 140 to perform inference on the input data of the high-precision format processed by the host processor 110 or on the image data of the high-precision format captured by the image sensor, the data may be desired to be converted into a low-precision format. Similarly, it may be more efficient, in terms of the memory bandwidth or the operation quantity for the accelerator 140, for the storage device 120 storing the data processed by the host processor 110 to perform such data format conversion and then transmit the input data of the low-precision format to the accelerator 140.

Hereinafter, examples will be described in more detail.

Figure 2:
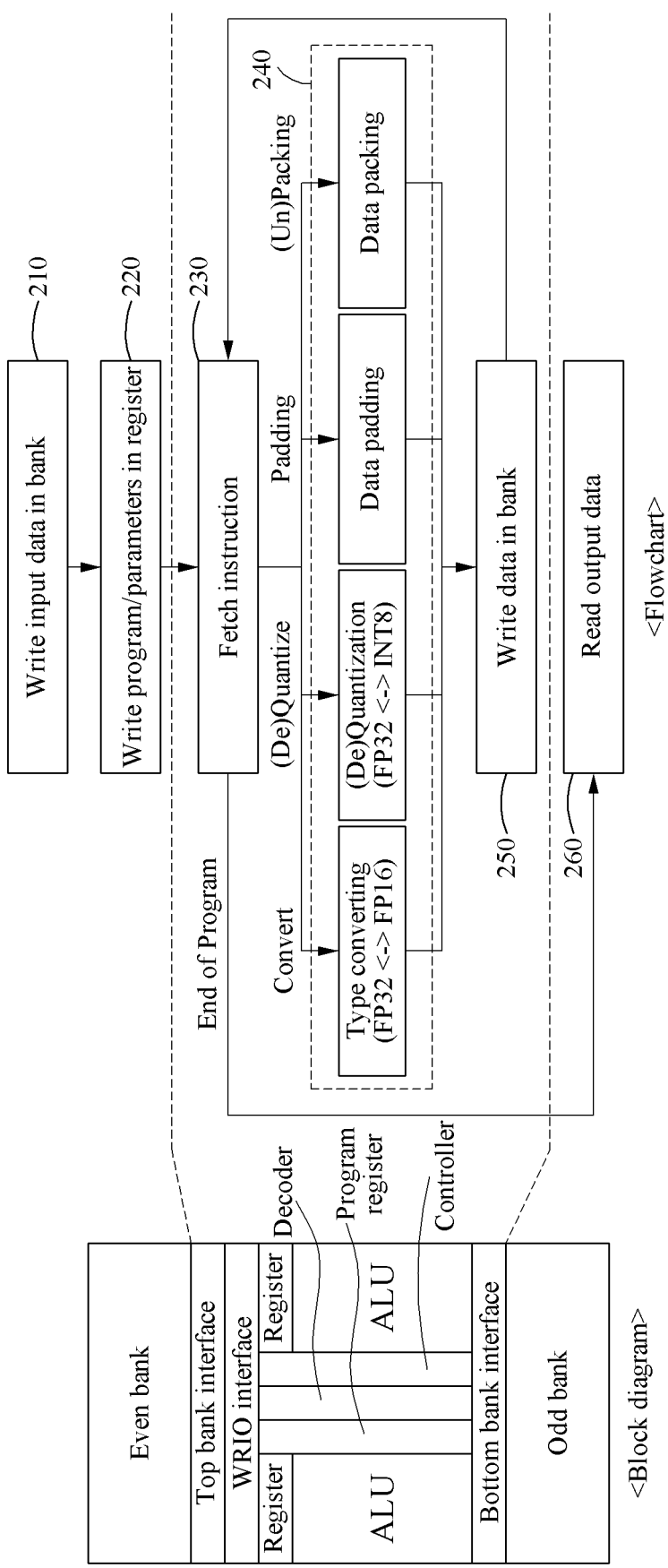
FIG. 2 illustrates an example of a storage device and an operation thereof.

FIG. 2 illustrates an example of a storage device and an operation thereof.

Referring to FIG. 2, a block diagram illustrating a storage device and a flowchart illustrating an operation of the storage device are shown.

In the block diagram of FIG. 2, a storage device may include banks, a top bank interface, a write read input output (WRIO) interface, a decoder, a controller, one or more registers, a program register, one or more arithmetic logic units (ALUs), and a bottom bank interface. However, the storage device is not limited to the example shown in the block diagram of FIG. 2, and may be applied to various combinations of components and various numbers of components without limitation.

The even and odd banks are areas configured to store data, and may be areas that are distinguished from each other by memory addresses. The top bank interface and the WRIO interface may control the input and output of data stored in the even bank. The decoder may interpret an instruction to determine what type of operation is the format conversion to be performed through the one or more ALUs, and transmit the result to the controller so that the one or more ALUs may perform the determined operation under the control of the controller. A program for the format conversion performed by the one or more ALUs may be stored in the program register, and data subject to the format conversion may be stored in the register. The one or more ALUs may convert the format of the data stored in the register according to the program stored in the program register under the control of the controller. The one or more ALUs may be operators including an adder, a multiplier, and the like to perform an operation in accordance with an instruction. The bottom bank interface may store the data of the format converted by the one or more ALUs in the odd bank.

In this way, when a bank configured to store data and one or more ALUs configured to perform format conversion are disposed adjacent to each other in the same storage device, the cost for memory access and the internal memory bandwidth may be minimized.

In the flowchart of FIG. 2, in operation 210, input data subject to format conversion may be written in the bank. In this example, the input data may be data received from a host processor or an external device (for example, an image sensor). In operation 220, format conversion to be performed may be identified, and a corresponding program and parameters may be written in the one or more registers. The program and parameters may include information about an operation to be performed, an address value at which data subject to the operation are stored, an address value at which a result of performing the operation is to be stored, and the like. In operation 230, an operation to be performed may be identified according to a fetch instruction included in the program. If the fetch instruction corresponds to any one of type converting, quantization/dequantization, padding, and packing/unpacking, operation 240 may follow. If the program ends, operation 260 may follow.

In operation 240, at least one of type converting, quantization/dequantization, padding, and packing/unpacking may be performed by the one or more ALUs in the storage device. These operations correspond to pre-processing and/or post-processing for the neural network-based inference operation. Thus, when the operations are performed by the one or more ALUs in the storage device, the system throughput may effectively improve. In addition, these operations may be performed by relatively simple one or more ALUs. Thus, even when the one or more ALUs are included in the storage device, the area or size of the storage device may increase relatively less.

Type converting refers to conversion between a 32-bit floating point (FP32) format and a 16-bit floating point (FP16) format. When type converting is performed, data may be converted from one format to another format. Quantization refers to converting the 32-bit floating point format to an 8-bit integer format, and dequantization refers to converting the 8-bit integer (INT8) format to the 32-bit floating point format. Data padding refers to adding, to data to be processed, a predetermined bit value (for example, "0" or "1") or a predetermined bit pattern (for example, a bit pattern mirroring the last bit included in the data) so that the data have a size suitable for an operation unit of hardware, if the data are not suitable for the operation unit. Data packing refers to merging multiple data in a low-precision format to process data converted from a high-precision format (for example, FP32) to a low-precision format (for example, FP16) according to an operation unit (for example, FP32) of hardware. Data unpacking is an operation opposite to packing, and refers to dividing packed data into two or more.

In operation 250, a result of performing one of type converting, quantization, dequantization, padding, packing, and unpacking by the one or more ALUs may be written in the bank. Then, operation 230 may be performed again.

Format conversion may be performed in a manner of performing type converting or quantization/dequantization first, followed by packing or padding. However, format conversion is not limited thereto and may be performed in various combinations.

In operation 260, output data may be read out from a subsequent system after the program ends.

The format conversion described above may be applied to data pre-processing and/or post-processing, thereby minimizing software overhead and memory bandwidth, and maximizing the utilization of an accelerator of a low-precision format.

Figure 3:
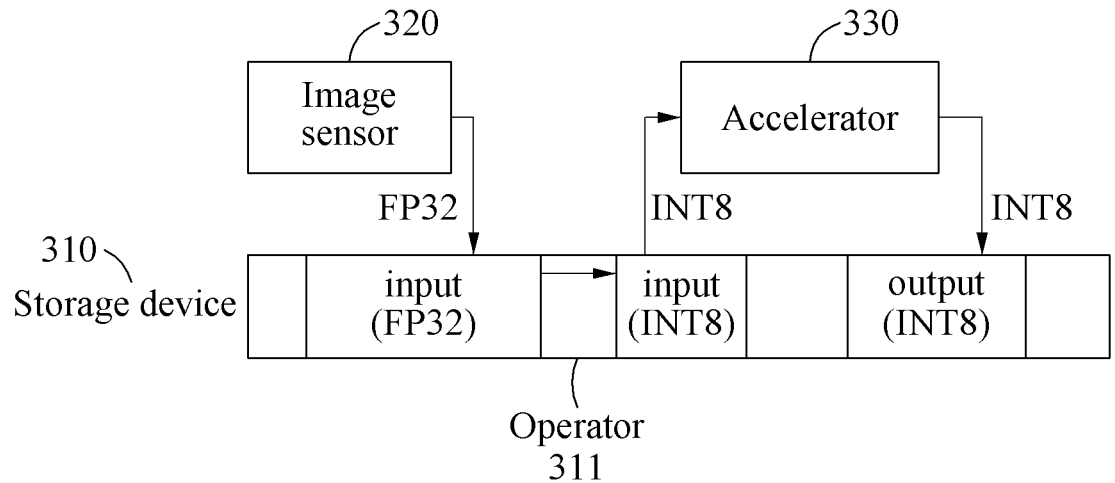
FIGS. 3 to 5 illustrate examples of operations of storage devices.
Figure 4:
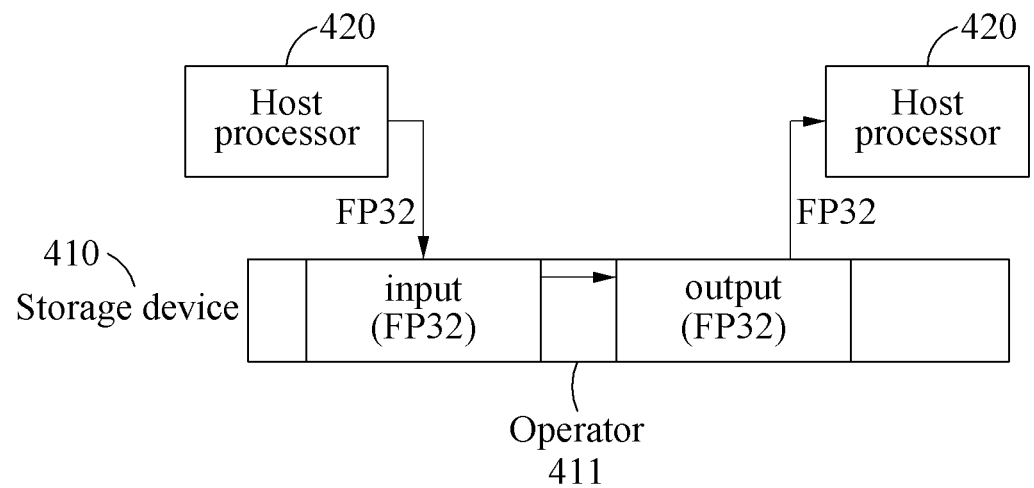
Figure 5:
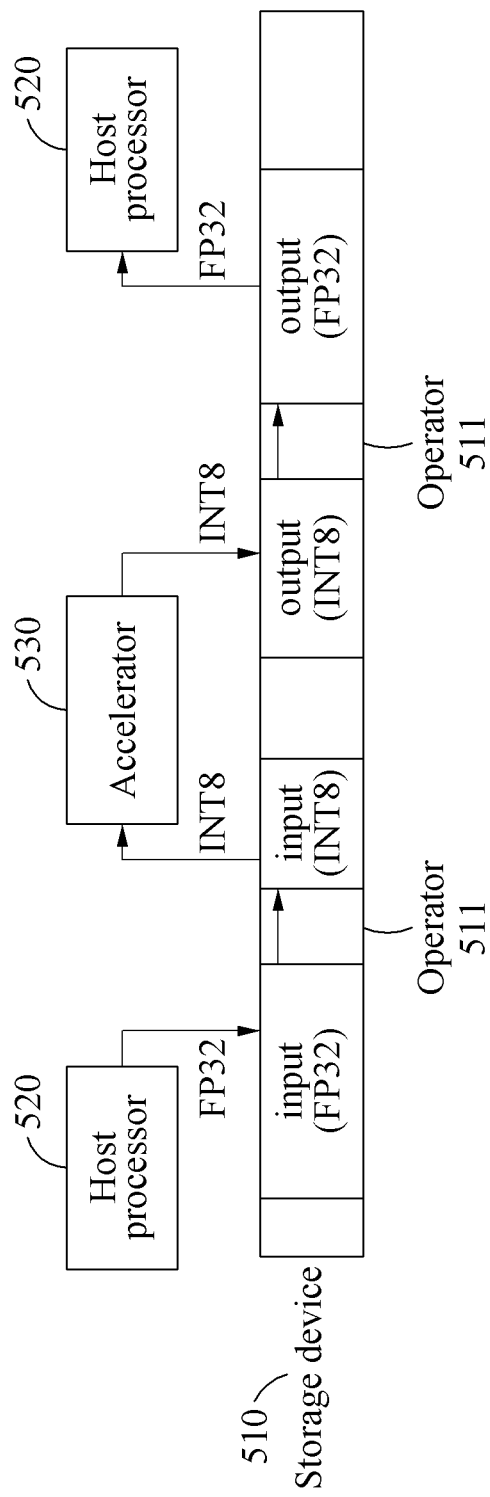

FIGS. 3 to 5 illustrate examples of operations of storage devices.

Referring to FIG. 3, an example of performing pre-processing on input data by a storage device 310 is illustrated. For example, when image data of a high-precision format (for example, FP32) captured by an image sensor 320 are input, the storage device 310 may first store the input data in the high-precision format. An operator 311 in the storage device 310 may perform pre-processing prior to transmitting the input data to an accelerator 330 for inference. For example, the operator 311 may perform quantization to convert the input data of the high-precision format into a low-precision format (for example, INT8). In addition, the operator 311 may perform packing and/or padding on the quantized data to process the input data to correspond to an operation unit of the accelerator 330. The input data pre-processed by the operator 311 may be stored in the storage device 310 and transmitted to the accelerator 330 for inference by the accelerator 330. Since the data are transmitted from the storage device 310 to the accelerator 330 in the low-precision format, rather than the high-precision format received from the image sensor 320, the memory bandwidth usage may be effectively minimized. For example, the data may be transmitted from the storage device 310 to the accelerator 330 in an INT8 format, rather than an FP32 format, whereby the memory bandwidth may be reduced to ¼. The accelerator 330 that operates in a low-precision format may apply an inference operation to the received input data without performing a separate format conversion. The result data may be transmitted from the accelerator 330 to the storage device 310 in the low-precision format and stored in the storage device 310. In this example, the memory bandwidth usage may be effectively reduced.

Referring to FIG. 4, an example of performing pre-processing and an operation on data by a storage device 410 is illustrated. For example, an operator 411 in the storage device 410 may perform a predetermined operation in addition to the format conversion of data. In this example, the operation performed by the operator 411 may be performed in a predetermined precision format (for example, FP16). In this case, input data of a high-precision format (for example, FP32) received from a host processor 420 may be stored in the storage device 410 and then converted into an operation format for the operator 411. The operator 411 may convert the input data of the high-precision format into a predetermined precision format. In some examples, the operator 411 may additionally perform packing on the converted data to process the input data to correspond to an operation unit of the operator 411. A predetermined operation may be performed by the operator 411 based on the pre-processed data. In addition, the operator 411 may perform dequantization and/or unpacking to convert operation result data of the predetermined precision format into a high-precision format, and store the converted data in the storage device 410. The result data of the high-precision format may be transmitted back to the host processor 420, and a subsequent operation may be performed thereon.

Referring to FIG. 5, an example of performing pre-processing on input data by a storage device 510 is illustrated. For example, when data of a high-precision format (for example, FP32) processed by a host processor 520 are input, the storage device 510 may first store the input data in the high-precision format. An operator 511 in the storage device 510 may perform pre-processing on the input data prior to transmitting the input data to an accelerator 530 for inference. For example, the operator 511 may perform quantization to convert the input data of the high-precision format into a low-precision format (for example, INT8). In addition, the operator 511 may perform packing and/or padding on the quantized data to process the input data to correspond to an operation unit of the accelerator 530. The input data pre-processed by the operator 511 may be stored in the storage device 510 and transmitted to the accelerator 330 for inference. Result data of the operation performed by the accelerator 530 in a low-precision format may be transmitted back to the storage device 510. The operator 511 may perform dequantization to convert the result data of the low-precision format into a high-precision format so that the result data are processed by the host processor 520. In addition, in some cases, the operator 511 may additionally perform unpacking and/or padding so that the result data may be processed to correspond to an operation unit of the host processor 520. The result data post-processed by the operator 511 may be transmitted to the host processor 520, and the host processor 520 may directly process the result data without performing a separate format conversion.

Figure 6:
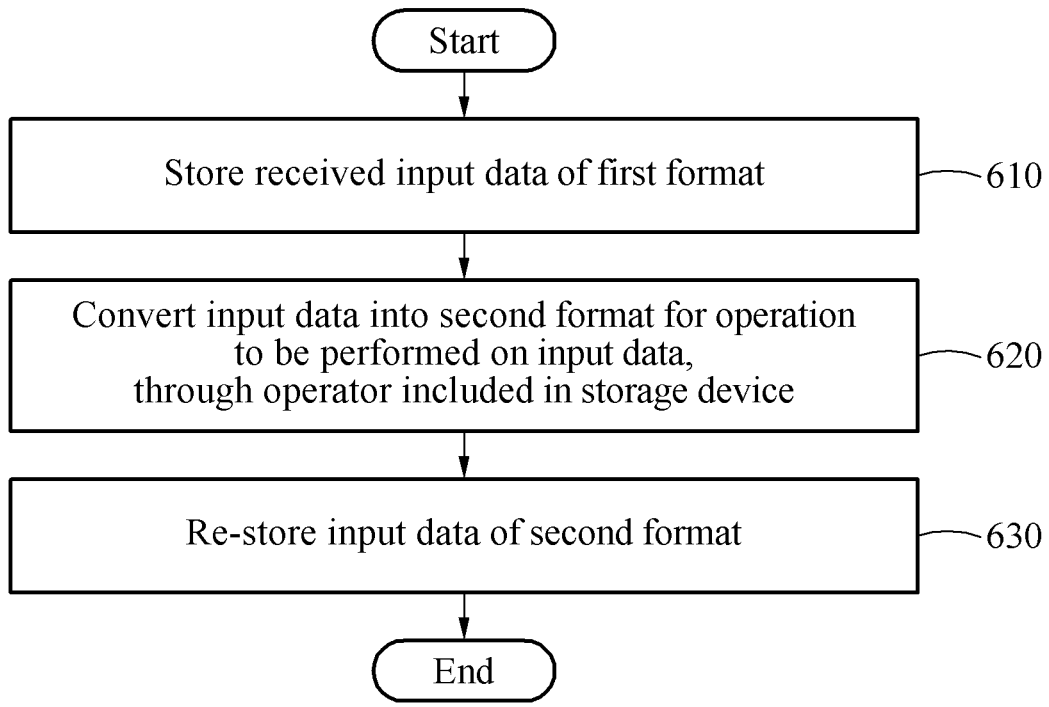
FIG. 6 illustrates an example of a method of operating a storage device.

FIG. 6 illustrates an example of a method of operating a storage device.

Referring to FIG. 6, an operation method performed by a processor of a storage device is illustrated.

In operation 610, the storage device stores received input data of a first format. For example, the storage device may be a DRAM located outside an accelerator that performs an operation.

In operation 620, the storage device converts the input data into a second format for an operation to be performed on the input data, through an operator included in the storage device. For example, the storage device may convert the input data of the first format into the second format by applying any one or any combination of type converting, quantization, dequantization, padding, packing, and unpacking to the input data of the first format. In this example, the second format may have a lower memory bandwidth than the first format.

In operation 630, the storage device re-stores the input data of the second format.

The descriptions provided with reference to FIGS. 1 to 5 may apply to the operations shown in FIG. 6, and thus further detailed descriptions will be omitted.

Figure 7:
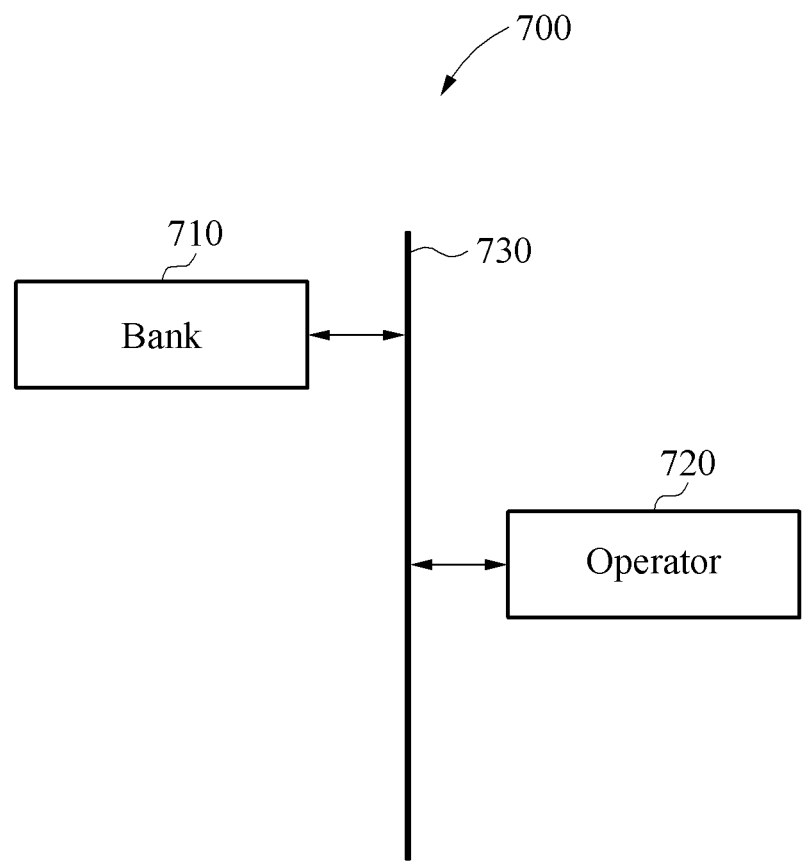
FIG. 7 illustrates an example of a storage device.

FIG. 7 illustrates an example of a storage device.

Referring to FIG. 7, a storage device 700 includes a bank 710 configured to store received input data of a first format, and an operator 720 disposed adjacent to the bank 710 to convert the input data into a second format for an operation to be performed on the input data. In this example, the input data of the second format are re-stored in the bank 710. The bank 710 and the operator 720 may communicate with each other through a bus 730.

In the storage device 700, the operator 720 may be implemented in the form of an in-memory chip and mounted on a mobile system or a server. Alternatively, the operator 720 may be mounted in the form of a software development kit (SDK) provided along with an in-memory chip. Further, the storage device 700 may be implemented as a memory for a server system for a data center or a memory for a mobile device or a smart home appliance (for example, a smart TV) and mounted on an electronic device together with an accelerator configured to operate in an FP16 and/or INT8 format.

The descriptions provided with reference to FIGS. 1 to 5 may apply to the elements shown in FIG. 7, and thus further detailed descriptions will be omitted.

Figure 8:
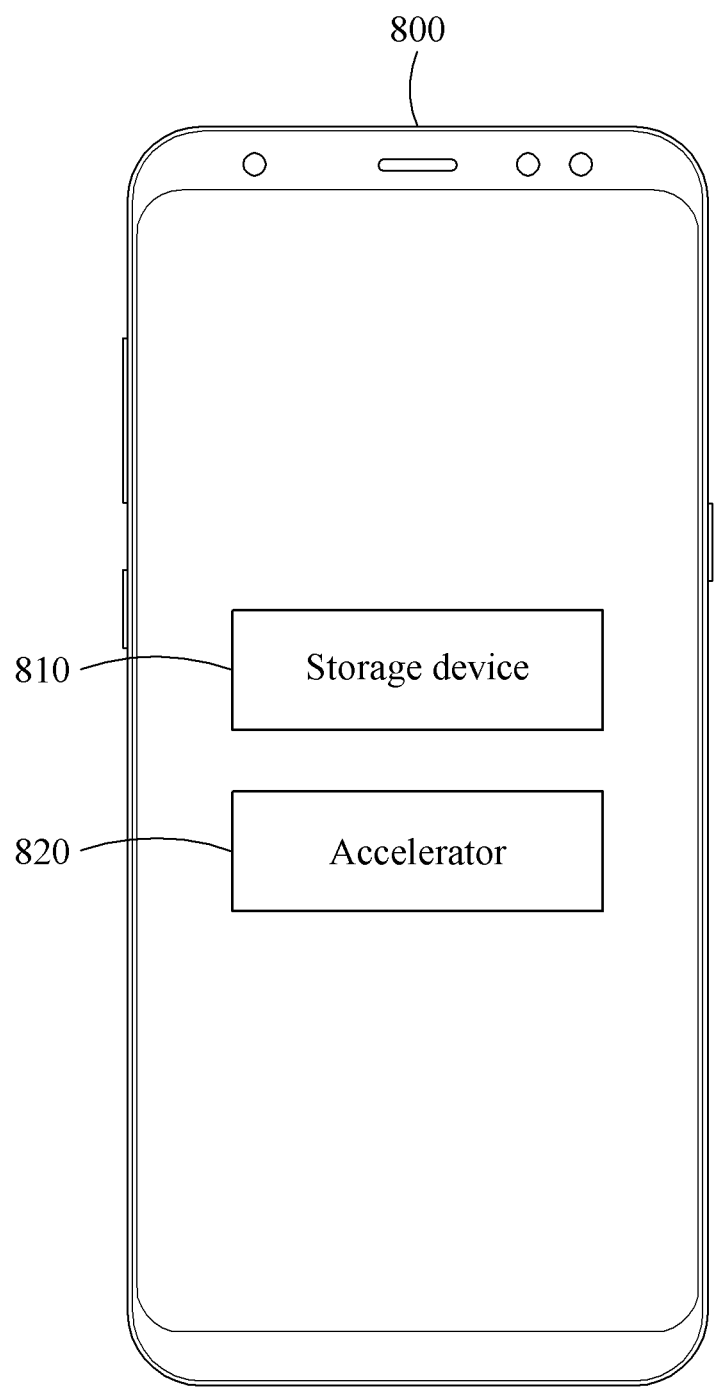
FIGS. 8 and 9 illustrate examples of electronic devices.
Figure 9:
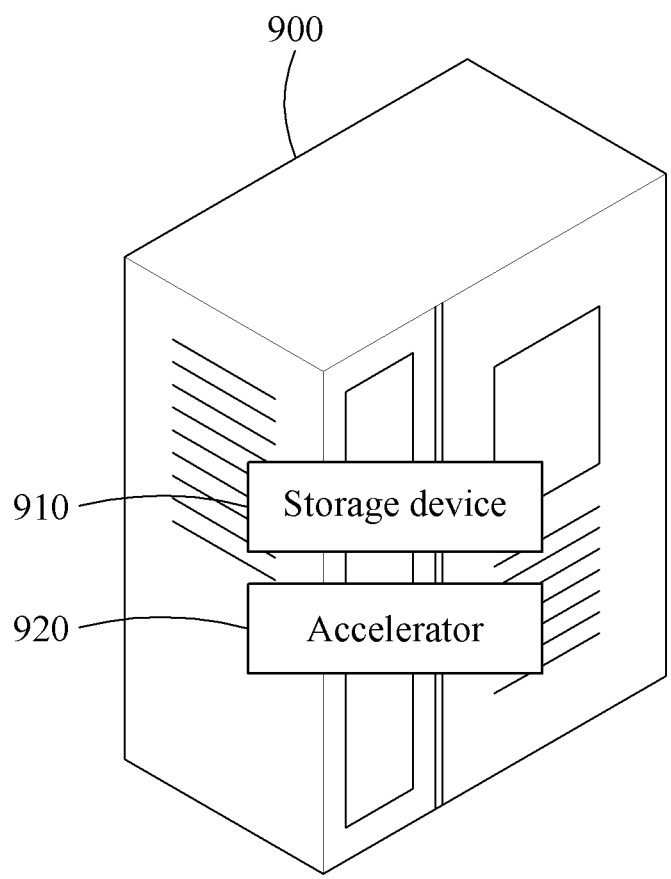

FIGS. 8 and 9 illustrate examples of electronic devices.

Referring to FIG. 8, an electronic device may be implemented as a user terminal 800. FIG. 8 illustrates the user terminal 800 as a smart phone for ease of description. However, the description may also apply, without limitation, to various computing devices such as a tablet, a laptop and a personal computer, various wearable devices such as a smart watch and smart glasses, various home appliances such as a smart speaker, a smart TV and a smart refrigerator, a smart car, a smart kiosk, Internet of things (IoT) device, a robot, and the like. The user terminal 800 may obtain data to be inferred directly by using a neural network and store the data in a storage device 810. The storage device 810 may perform pre-processing to convert input data of a high-precision format into input data of a low-precision format, and transmit the pre-processed input data to an accelerator 820. The accelerator 820 may directly apply an inference operation to the received input data without performing a separate format conversion, and then transmit result data back to the storage device 810. The storage device 810 may perform post-processing to convert the input data of the low-precision format into a high-precision format. The user terminal 800 may provide the result data of the high-precision format stored in the storage device 810 to a user, or may perform a subsequent operation based on the result data through a host processor.

Referring to FIG. 9, an electronic device may be implemented as a server 900. The server 900 is a separate device different from a user terminal controlled by a user, and may communicate with the user terminal through a wired and/or wireless network. Data to be inferred by using a neural network may be collected by a user terminal, transmitted to the server 900 through a network, and stored in the storage device 910. As described above, the storage device 910 may perform pre-processing or post-processing on the data prior to transmitting the data to the accelerator 920 or after receiving an inference result. The server 900 may return the inference result to the user terminal, and the user terminal may simply provide the user with the inference result received from the server 900, or perform a subsequent operation based on the inference result.

The electronic device 100, host processor 110, 420, 520, storage device 120, 310, 410, 510, 700, 810, 910, memory controller 130, accelerator 140, 330, 530, 820, 920, image sensor 320, operator, 311, 411, 511, 720, blank 710, user terminal 800, and server 900, electronic device, host processor, storage device, memory controller, accelerator, image sensor, operator, blank, user terminal, and server in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of operating a storage device, the method comprising:
   storing, in a bank included in the storage device, input data of a high precision format received from a host processor;
   determining that an instruction stored in the storage device corresponds to one or more operations of an operator included in the storage device;
   in response to the instruction corresponding to the one or more operations, converting, by the operator performing the one or more operations, the input data received from the host processor into a low precision format for an operation to be performed on the input data of the low precision format by an accelerator connected to the storage device; and
   re-storing, in the bank, the input data of the low precision format.

2. The method of claim 1, wherein the converting comprises converting the input data of the high precision format into the low precision format by applying any one or any combination of any two or more of type converting, quantization, dequantization, padding, packing, and unpacking to the input data of the high precision format.

3. The method of claim 1, wherein the low precision format has a lower memory bandwidth than the high precision format.

4. The method of claim 1, wherein the operation to be performed on the input data is a low precision operation in the low precision format and has a lower precision than a high precision operation in the high precision format.

5. The method of claim 1, wherein the operation is to be performed on the input data in the low precision format by the operator or the accelerator receiving the input data of the low precision format from the storage device.

6. The method of claim 1, wherein the operation to be performed on the input data is one of operations that are performed by a neural network configured to infer the input data.

7. The method of claim 1, further comprising:
   converting result data of the operation performed on the input data into the high precision format; and
   outputting the result data of the high precision format.

8. The method of claim 1, wherein the operator is disposed adjacent to a bank configured to store data in the storage device.

9. The method of claim 1, wherein the operator comprises an arithmetic logic unit (ALU) configured to perform a predetermined operation.

10. The method of claim 1, wherein the input data comprise at least one of:
    image data of the high precision format captured by an image sensor; and
    data of the high precision format processed by the host processor configured to control either one or both of the storage device and the accelerator connected to the storage device.

11. The method of claim 1, wherein the storage device is a dynamic random-access memory (DRAM) located outside the accelerator that performs the operation.

12. The method of claim 1, wherein the storage device is included in a user terminal into which data to be inferred through a neural network that performs the operation are input or a server that receives the data to be inferred from the user terminal.

13. The method of claim 1, wherein the high precision format is a 32-bit floating point (FP32) format and the low precision format is a 16-bit floating point (FP16) format or an 8-bit integer (INT8) format.

14. A non-transitory computer-readable storage medium storing instructions that, when executed by one or more processors, configure the one or more processors to perform the method of claim 1.

15. A storage device, comprising:
    a bank configured to store received input data of a high precision format; and
    a decoder configured to determine whether an instruction stored in the storage device corresponds to one or more operations of an operator disposed adjacent to the bank;
    the operator configured to, in response to the instruction corresponding to the one or more operations, convert the input data into a low precision format for an operation to be performed on the input data of the low precision format,
    wherein the input data of the low precision format are re-stored in the bank.

16. The storage device of claim 15, wherein the operator is configured to convert the input data of the high precision format into the low precision format by applying any one or any combination of any two or more of type converting, quantization, dequantization, padding, packing, and unpacking to the input data of the high precision format.

17. The storage device of claim 15, wherein the low precision format has a lower memory bandwidth than the high precision format.

18. The storage device of claim 15, wherein the operation to be performed on the input data is a low precision operation in the low precision format and has a lower precision than a high precision operation in the high precision format.

19. The storage device of claim 15, wherein the operator is configured to convert result data of the operation performed on the input data into the high precision format, and the bank is configured to store the result data of the high precision format.

20. The storage device of claim 15, wherein the high precision format is a 32-bit floating point (FP32) format and the low precision format is a 16-bit floating point (FP16) format or an 8-bit integer (INT8) format.

21. An electronic device, comprising the storage device of claim 15.

22. An electronic device, comprising:
    a storage device configured to store, in a bank included in the storage device, input data of a high precision format received from a host processor, determine whether an instruction stored in the storage device corresponds to one or more operations of an internal operator included in the storage device, convert, by the internal operator performing the one or more operations, the input data of the high precision format received from the host processor into a low precision format in response to the instruction corresponding to the one or more operations, and re-store, in the bank, the input data of the low precision format; and
    an accelerator configured to perform the operation on the input data of the low precision format received from the storage device.

23. The electronic device of claim 22, wherein the storage device comprises the internal operator configured to convert the input data of the high precision format into the low precision format by applying any one or any combination of any two or more of type converting, quantization, dequantization, padding, packing, and unpacking to the input data of the high precision format.

24. The electronic device of claim 23, wherein the high precision format is a 32-bit floating point (FP32) format and the low precision format is a 16-bit floating point (FP16) format or an 8-bit integer (INT8) format.

25. The electronic device of claim 23, wherein the accelerator is configured to perform an inference operation on the input data of the low precision format received from the storage device.

\* \* \* \* \*